(12) United States Patent
Jones et al.

(10) Patent No.: US 11,205,352 B2
(45) Date of Patent: Dec. 21, 2021

(54) REAL TIME PROGRESSIVE EXAMINATION PREPARATION PLATFORM SYSTEM AND METHOD

(71) Applicant: TazKai, LLC, Allen, TX (US)

(72) Inventors: Daniel Reeves Jones, Anna, TX (US); Jonathan Weeks Haws, Allen, TX (US)

(73) Assignee: TazKai, LLC, Allen, TX (US)

(*) Notice: Subject to any disclaimer, the term of this patent is extended or adjusted under 35 U.S.C. 154(b) by 366 days.

(21) Appl. No.: 16/445,466

(22) Filed: Jun. 19, 2019

(65) Prior Publication Data

US 2020/0402415 A1 Dec. 24, 2020

(51) Int. Cl.
*G09B 7/08* (2006.01)
*G06F 16/23* (2019.01)

(52) U.S. Cl.
CPC ........... *G09B 7/08* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 2005/0277103 A1* | 12/2005 | Townshend | ............... | G09B 7/00 434/362 |
| 2006/0121434 A1* | 6/2006 | Azar | .................. | G06Q 30/0282 434/350 |
| 2006/0183099 A1* | 8/2006 | Feely | ........................ | G09B 7/02 434/323 |
| 2009/0047648 A1* | 2/2009 | Ferreira | .................... | G09B 5/06 434/323 |
| 2012/0045744 A1* | 2/2012 | Nickolai | .................. | G09B 7/00 434/322 |
| 2013/0224718 A1* | 8/2013 | Woodward | ............... | G09B 7/00 434/350 |
| 2014/0255889 A1* | 9/2014 | Grimes | .................. | G06Q 50/20 434/236 |
| 2015/0044644 A1* | 2/2015 | Hsu | ........................ | G09B 19/06 434/157 |
| 2015/0099254 A1* | 4/2015 | Kamimaeda | ............. | G09B 7/08 434/322 |
| 2016/0062587 A1* | 3/2016 | Muller | ................ | G06F 3/04842 715/769 |
| 2016/0300503 A1* | 10/2016 | Diezmann | ................ | G09B 7/00 |
| 2017/0178531 A1* | 6/2017 | Swank | ..................... | G09B 7/08 |
| 2017/0345327 A1* | 11/2017 | Tai | .......................... | G09B 19/06 |
| 2018/0130368 A1* | 5/2018 | Jackman | .................. | G09B 7/08 |
| 2018/0130375 A1* | 5/2018 | Booth | ................ | G06Q 10/0639 |
| 2018/0286272 A1* | 10/2018 | Mcdermott | .............. | G09B 5/02 |
| 2019/0251857 A1* | 8/2019 | Lee | .......................... | G09B 7/06 |
| 2019/0378429 A1* | 12/2019 | Panuganty | .......... | G06F 16/9535 |
| 2020/0261018 A1* | 8/2020 | Saha | ..................... | A61B 5/165 |
| 2020/0357296 A1* | 11/2020 | Sharma | .................... | G09B 7/00 |

* cited by examiner

*Primary Examiner* — Justin S Lee
(74) *Attorney, Agent, or Firm* — Braxton Perrone, PLLC; Gregory Perrone; Bobby W. Braxton

(57) ABSTRACT

A computer implemented system and method for providing dynamic examination preparation course content to users wherein a progressive content module in real time assigns difficulty values to questions according to previous users' answer and selects future questions for an individual user according to previous answers received from the user and pass prediction values assigned to the user.

12 Claims, 5 Drawing Sheets

REAL TIME PROGRESSIVE EXAMINATION PREPARATION PLATFORM SYSTEM AND METHOD

BACKGROUND OF THE INVENTION

Technical Field

The present invention relates to a system and method for providing examination preparation content to test-takers.

Description of Related Art

Individuals today embark on careers or fields of study in which taking and passing of standardized tests are required for university admission at the undergraduate degree level and higher and for certification in a particular profession or field. Several study aids are available to those required to take such exams in hard copy and electronic form. Various online review courses are available that provide users with sample test questions that are answered in preparation for the real examination. These courses, however, provide users with redundant and often stale question content, which after even a modest time of study lose effectiveness in terms of increasing the user's likelihood of passing the actual test. Moreover, current study aids do little to provide a meaningful forecast of how the user will fare when taking the actual test. Consequently, there is a need for a superior knowledge assessment tool that prepares users for the test and provides a forecast of how the user will perform when taking the actual test that is based on a plurality of user answers.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
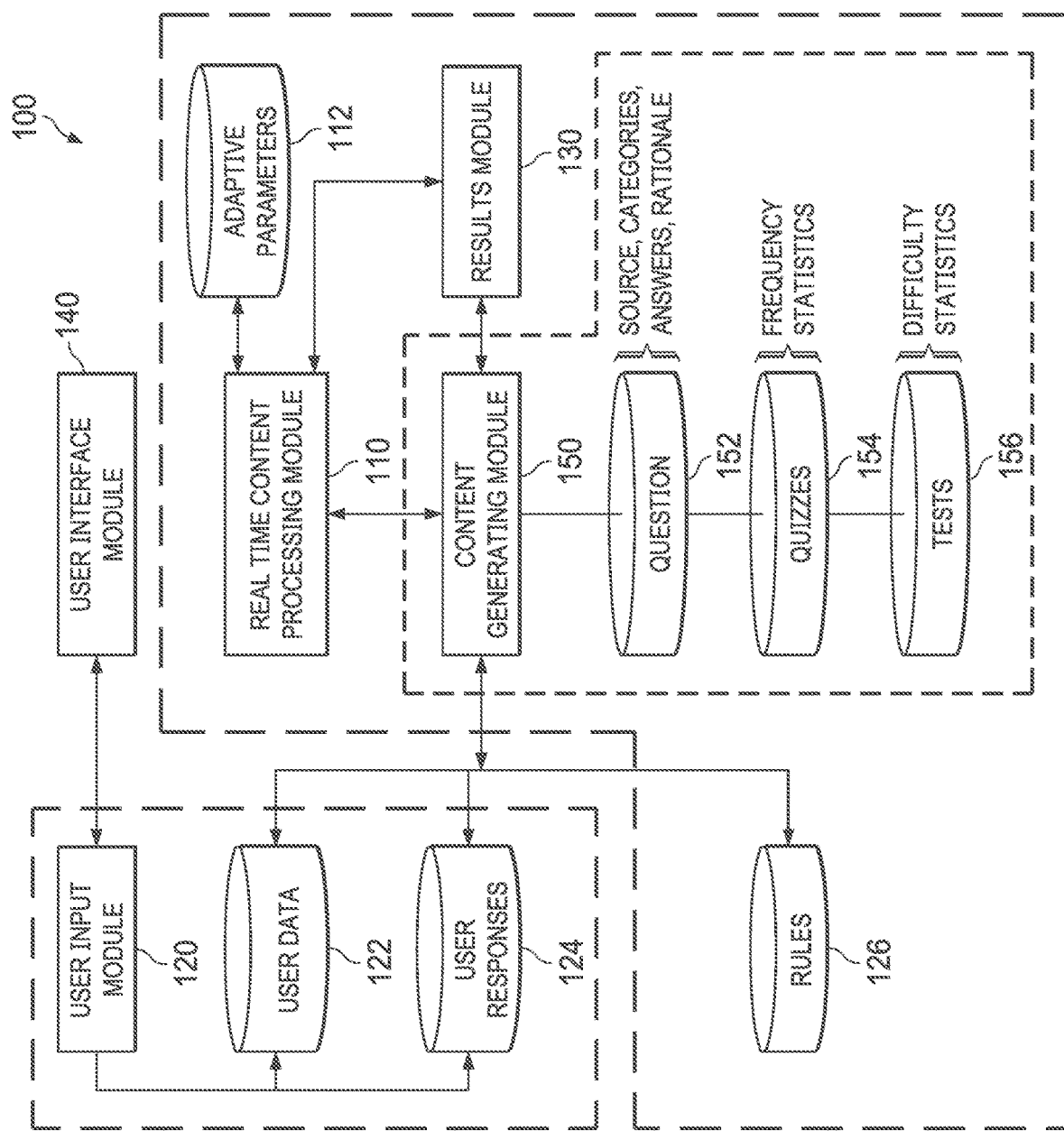
FIG. 1 is a block diagram of the Real Time Progressive Examination Preparation platform, according to one embodiment of the present invention.

FIG. 1 is a block diagram of the Real Time Progressive Examination Preparation (RTPEP) platform according to an embodiment of the present invention. Referring to FIG. 1, the RTPEP platform 100 comprises real time content processing module 110 to which is associated adaptive parameter database 112. Adaptive parameters database 112 can include rules and data received from historic quiz and test data that is used to create question difficulty value indices, question difficulty value thresholds or tiers of difficulty values that can be applied to quiz or test questions.

User input module 120 receives input through user interface 140. The user in this context is the person preparing for or taking an exam and receiving content from RTPEP platform 100. User data database 122 and user response database 124 receive data through user input module 120. User data database 122 can include user information associated with the user's enrollment in the RTPEP system as well as RTPEP platform 100 login credentials and other attributes of the user. User response database 124 can include user responses to relevant quizzes and tests taken by the user through the RTPEP platform as well as isolated questions posed to the user via mobile device, personal computer, portable device or the like. Each user's response is stored for later use and processing by RTPEP platform 100 as will be discussed. Rules database 126 contains data and rules information received from progressive content module 110 and adaptive parameters database 112.

Content generation module 150 can contain multiple databases, including questions database 152, quiz database 154 and test database 156. Questions database 152 can include source questions that are prepared by authorized developers of questions to be used in the RTPEP platform. Questions in questions database 152 have associated with them attributes allowing each question to be selected according to either user defined parameters or RTPEP platform administrator requirements in creating a quiz or test. Questions database 152 can also include category data, answers, and answer rationale information. Category data is information that can include a question type or reflect a learning hierarchy such as a Blooms Taxonomy methodology. Category data can be used in RTPEP platform 100 to determine questions to be included within a quiz question set according to user selections and based on previously asked questions and preestablished thresholds for a number of questions from different categories that are to be included within a quiz question set. Category data can also include a difficulty level assigned to a question. The difficulty level can be computed on a percentile scale (from 0 to 100) or based on a set of tiers corresponding to a bell curve distribution. For the latter, the tier placement of a question in terms of difficulty can be based at least in part on historical results of global users answering that question.

Also stored in questions database 152 are question answers and answer rationale. Answer rationale refers to the reason for a particular answer. This information permits the user to understand why a question was answered correctly or incorrectly.

Quiz database 154 contains identification of questions and groupings of questions that corresponds to a given quiz to a user as well as information concerning the frequency at which a particular quiz question was given. The frequency at which a quiz question is given is used to determine when a quiz question will mature into a test question.

Test database 156 can include identification of questions given as a test question as well as groupings of test questions on a given test. Test database 156 can also include statistics concerning the frequency in which a particular question was asked, the difficulty level of a test question, either on a percentile scale or within a tier among multiple tiers of difficulty for test questions, or a category to which a test question corresponds.

Rules database 126 in which various rules are stored that are to be applied during a test according to test answers submitted during current and past tests is provided. Real time content processing module 110 draws from the rules database 126 to determine various treatment of a question, including whether a quiz question should mature into a test question, whether a test question of a particular difficulty (more difficult or less difficult) should be the next test question, or if the next test question should be one corresponding to a particular category. Rules database 126 is updated in real time through the real time content processing module 110 according to new or updates to user data stored in user database 122 and current user responses from user response database 124.

Real time content processing module 110 receives input data from user input module 120. Real time content processing module 110 also can communicate with results module 130. Results module 130 includes individual user statistics based on examination questions answered by individual users, taking into account answers of platform wide users.

Real time progressive content processing module 110 processes input data and can extract from the textual part of the data. Real time content processing module 110 is the main management module that links together the functionality of the other modules and is the engine for providing users with a real time progressive testing environment. In the accompanying figures, the linking of this functionality is depicted via arrow connections for processing flow in either direction to link together the module functionality. Real time content processing module 110, among other things, is responsible for causing delivery of structured and targeted content to users according to predefined parameters and objectives, including targeted distribution of practice examination questions by subject matter and adjusting the difficulty level of questions presented to the user according to predicted practice test outcomes. This functionality provides users with an optimal testing tool and provides educators and testing administrators with the knowledge necessary to create effective practice test content.

Real time content processing module 110 can interface with content resources from other systems. Import data can be provided in a variety of formats that can be accommodated by real time processing module 110 and can include an interface module between existing systems and the real time system of the invention. Real time content processing module 110 provides structured content data by importing them from another system.

Content generation module 150 uses information provided by educators and administrators stored in questions database 152 to generate practice quiz and test questions that can be received by users via user interface 140 according to an appropriate mark up language.

User interface module 140 can include a graphic user interface module through which a user can select different examination preparation course options from graphic or textual content presented to the user through any digital device via an appropriate communication channel such as the Internet, LAN, CD-ROM, etc. Depending on the depth in which the user wishes to engage the present RTPEP platform, the platform can provide individual practice questions on demand, create quizzes for the user that are customizable based on various topics of emphasis or a selected level of question difficulty. RTPEP platform can also administer practice examinations that closely replicate actual examinations in various fields of study or profession. One such examination is the NCLEX®-RN examinations administered to those seeking to become a registered nurse. The RTPEP platform, through its administrators and educators, presents users with created examination questions content that closely reflects actual NCLEX content. Widespread enrollment by users of the RTPEP platform provides the volume of test questions results that enables real time content processing module 110 to accurately and continuously assign the appropriate level of difficulty to questions, prompt creation of better content and provide users with accurate examination success predictions.

Content processing module 110, user input module 120, results module 130, user interface module 140 and content generation module 150 can each be controlled by one or more processors. Each module can include or be in communication with one or more memory devices, display devices, input devices, communication devices, storage devices, and drivers, which can be mutually connected through a communication bus.

A processor can control each of the modules in accordance with one or more programs stored in a memory device or one of the various databases described. The memory device can include a Random Access Memory (RAM), a Read-Only Memory (ROM), and the like. The memory device stores the program to be executed by the processor, data for processes performed by the processor, data acquired in the processes performed, and the like. A portion of an area of the memory device. The programs made available to the RTPEP user via user interface module 140 that enable receiving and transmitting information to the user, such as those described in FIGS. 2 through 6, can be made available by a storage medium such as a Compact Disc Read-Only Memory (CD-ROM) and the like. The storage medium can be formed by a non-transitory (or tangible) computer-readable storage medium. The storage medium can be any computer-readable storage medium. The computer-readable storage medium can be a portable recording medium such as a Digital Versatile Disk (DVD) disk, a Universal Serial Bus (USB) memory, or the like, or a semiconductor memory such as a flash memory or the like, as well as the CD-ROM. In the alternative, the user available programs can be made available to the user over a wide area network, such as the Internet, once the user is enrolled as a RTPEP user.

A display device of the user interface module can display various information items under control of a processor. User interface module can include a mouse, a keyboard, and the like, for use by the user to input the various information, such as quiz and test answers that are used by the processes conducted by the various RTPEP modules. The various data stores or databases 112, 122, 124, 126, 152, 154 and 156 of FIG. 1 can include a hard disk unit, and store data and programs for conducting various processes and the like.

Figure 2:
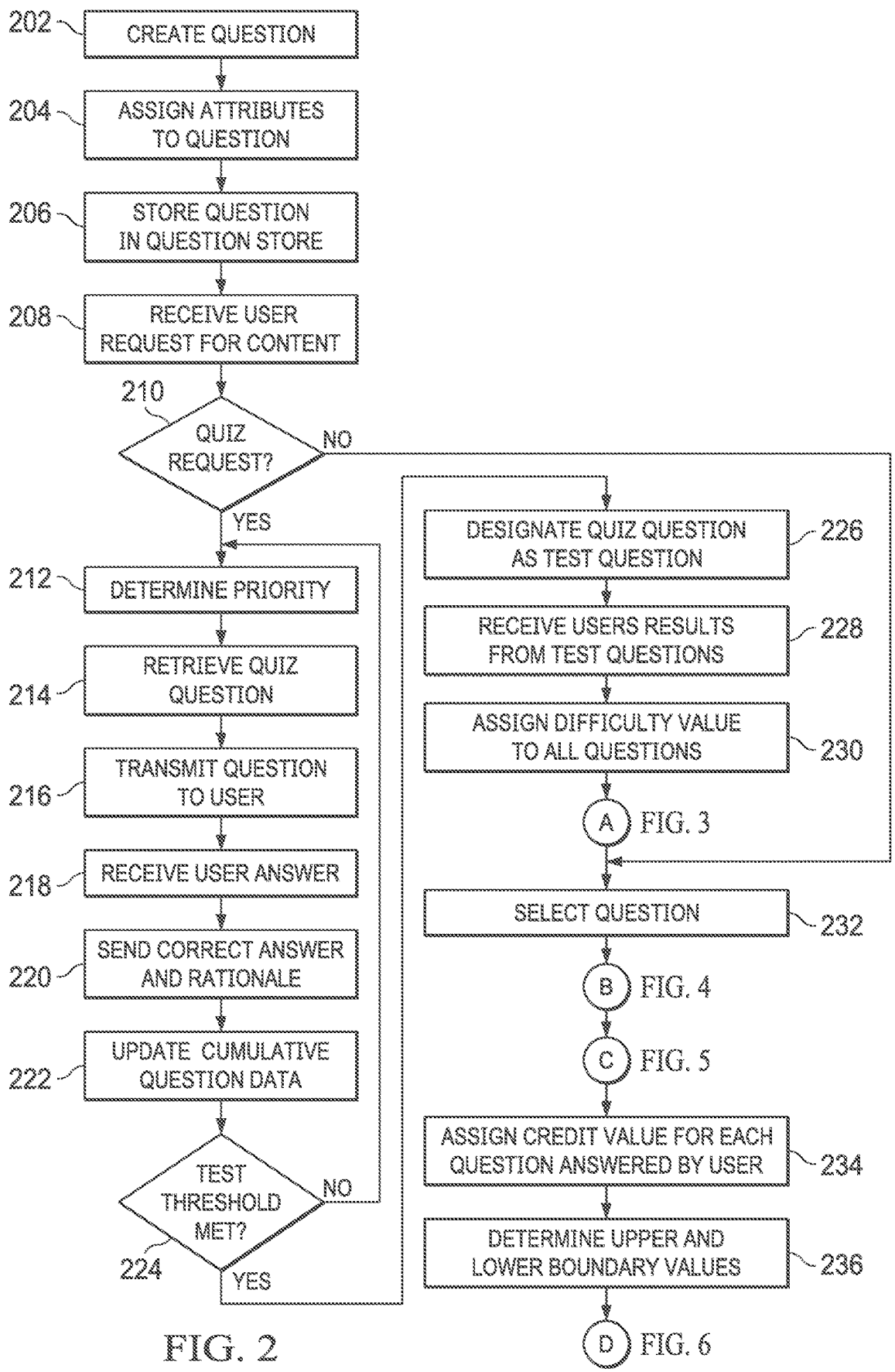
FIG. 2 is a flow diagram illustrating the steps of a process performed according to an embodiment of the Real Time Progressive Examination Preparation platform.

FIG. 2 is a flowchart of a question selection process performed according to an embodiment of RTPEP platform 100. The process of FIG. 2 begins with step 202 in which a question is created. In one embodiment, the content generating module 150, user interface module 140, results module 130 and real time content processing module 110, through associated programs, perform in whole or in part the various steps detailed in FIG. 2. It is contemplated that educators in the relevant field of testing or study will create questions used to aid users in ultimately passing the test of interest. At step 204, a question is assigned various attributes. These attributes include the question category, the question answer, the source of the question and the question rationale. Once the question is created and assigned various attributes the process continues at step 206 where the question is stored in questions database 152.

The process of FIG. 2 continues at step 208 with the user requesting content in the form of practice test information through user interface 140. Typically, the user will create a unique user name and password via the user interface when enrolling as a user of RTPEP platform 100. These user credentials are stored in user data database 122. Once enrolled and logged in the user can enter RTPEP platform 100 and request practice questions or a quiz. At step 210 the platform queries at step 210 whether the user has requested a quiz, (as opposed to a test or just a question to answer). If the answer to query 210 is "yes", then a priority determination is made at step 212 by real time processing module 110 as to which quiz question should be retrieved. This priority determination is based on the number of times a question has been included in a quiz. A question must be included in a quiz by more than a preset frequency in order for that quiz question to be eligible for inclusion as a test question. As part of this priority determination, RTPEP platform 100 (in one embodiment via real time processing module 110) identifies which questions have been asked least frequently. In addition, during step 212 platform 100 identifies which category of question should be included in order to maintain a pre-defined distribution of question topics within a quiz. Once a question is identified as having the highest priority for inclusion, the question is retrieved from question database 152 at step 214 and transmitted to the user at step 216. The question is transmitted to the user in step 216 as part of a quiz at this stage and is presented to the user via user interface 140, such as the display of a mobile device, personal computer, tablet or other suitable device to receive such information through a wide area network such as the Internet.

Once a selected question is sent to the user, platform 100 awaits the user's response. At step 218 platform 100 receives the user's response to the question most recently sent at step 216. The user's response prompts step 220 at which time platform 100 transmits an indication to the user of whether the question was answered correctly or incorrectly and the rationale of the correct answer. In one embodiment, the rationale information is retrieved from question store 152 by content generating module 150, although other modules can participate in performing various aspects of this step. This information allows the user to learn why he or she may have answered a question incorrectly. At step 222, platform 100 updates quiz database 154 and user response database 124 with information corresponding to whether the question was answered correctly, that this particular user so answered the question and increases the count for which that question was included in a quiz.

At step 224, platform 100 queries whether the question last presented met the threshold frequency required for that question to be designated as an available test question. If the answer of query 224 is "yes", then the previously asked is designated by real time content processing module 110 as eligible for inclusion as a test question at step 226. This designation at step 226 entails updating question database 152 to reflect that the specific question may nowbe included in a test. Test question store 156 can also be updated by module 110 to reflect that this newly designated question is now eligible for inclusion in a test. If, on the other hand, the answer of query 224 is "no", platform 100 awaits another question request.

In parallel with the steps of FIG. 2 discussed above, real time content processing module 110 continues to update the question, quiz and test databases, 152, 154 and 156, with new questions generated by educators and responses received system wide by all users of platform 100. In this manner, information associated with a question, including the priority it is given at the selection stage, whether the question is eligible to be included as a test question, and the difficulty level of the question, is updated in real time by real time content processing module 110. As a result, a user request to take a quiz or test takes into account data generated from other users while answering quiz or test questions. For example, a user requesting a practice test will be provided with new test questions that just seconds earlier were only quiz questions because of that question's frequency requirement had not been met. Similarly, a user seeking a quiz receives a question from a category based on a new priority determination made immediately prior to the question request based on questions given to and answered by other users. Real time content processing module 110 of platform 100 constantly recalibrates in real time to provide users with the most relevant quiz and test content to better prepare the user for success.

Figure 3:
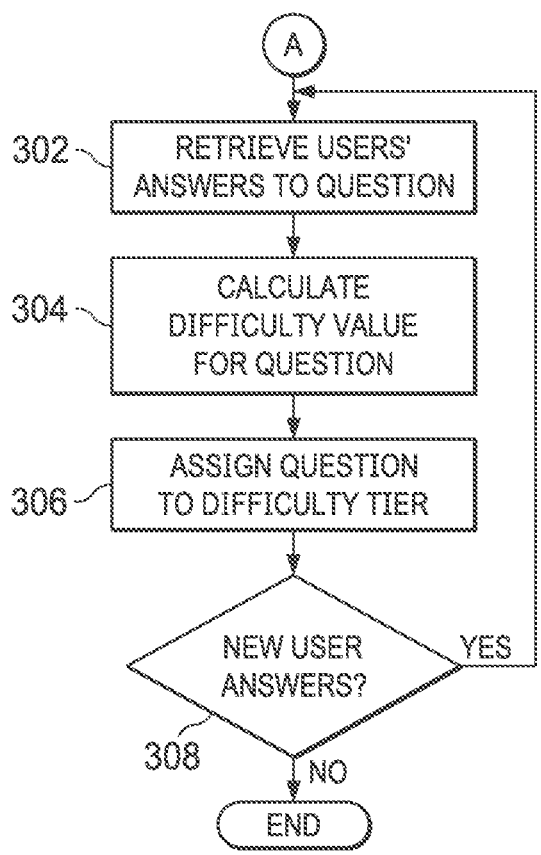
FIG. 3 is a flow diagram illustrating detailed steps of certain steps of the process of FIG. 2 performed according to an embodiment of the Real Time Progressive Examination Preparation platform.

Returning again to FIG. 2, this real time updating of content includes step 228 in which real time content processing module 110 receives other user results from test questions. As test and quiz answers from multiple users continue to be received, the process continues at step 230 in which a difficulty value is assigned or updated for each question for which a response is received. At this stage, the process of assigning a question to a particular difficulty level is depicted in the flowchart of FIG. 3. In one embodiment, the content generating module 150, user interface module 140, results module 130 and real time content processing module 110, through associated programs, perform in whole or in part the various steps detailed in FIG. 3. In FIG. 3, the process that is invoked following step 230 in FIG. 2, real time content processing module 110 continually receives users' answers to questions at step 302. At step 304, a difficulty value is calculated for each question for which an answer is received. This calculation can, in one embodiment, be based on the percentage of users who have been asked the question who answered correctly. For the least difficult questions for which no incorrect answer was submitted by any user, the value will be zero. For the most difficult questions for which no correct answer was submitted, the value will be 100. For most questions, this difficulty value will fall somewhere in between zero and 100 as correct and incorrect answers will be received from users. In the alternative, a broader array of difficult tiers can be designated. In one embodiment, eight tiers spanning a bell curve or normal curve where the mean of the score of all questions represents the center or peak of the curve. The standard deviation of the universe of answers defines the spread of the curve. The distribution can be divided into a fixed number of segments or tiers. Once the tiers are established, individual questions can be assigned to a tier based on the historic user answers to an individual question.

For example, if the mean score of all questions is 65, then the center point and peak of the bell curve will be 65. From this point, a set number of tiers may be established based on determining standard deviations from the peak. If the curve is broken into eight tiers, then a question will be assigned and reassigned to a tier based on the answers received from a plurality of users for each individual question. Thus, at step 306, a question is assigned and continually reassigned to a tier if the tier methodology for designating difficult is used. On the other hand, a value between zero and 100 can be assigned and reassigned to a particular question if the percentile methodology is chosen. Under either methodology, real time content processing module 110 continually recalibrates the difficulty level of all questions in real time as new answers are received from users, this difficulty level along with other data is used to determine the next question to be sent to a user.

Continuing with FIG. 3, after a difficulty level is assigned the process continues at step 308 where the query is posed of whether new user answers are received. If the answer of query 308 is "yes" then the process loops back to step 302 where the most recently received user answers are retrieved and real time content processing module 110 recalculates the difficult value for that questions. In rare instances where no new user answers are received, the answer at step 308 is "no" and the process ends. It is contemplated, however, that widely used test preparation systems operated according to the herein described embodiments of the RTPEP platform will continuously receive user answers. This is significant not only in terms of providing users with real time progressive practice test questions but with providing administrators and educators with up to the minute, real time information concerning system-wide trends. For instance, as users realize improvements in test results, some test questions may be re-designated with a higher percentile score or a lower difficulty tier. Over time, as user knowledge evolves, more questions will likely be answered correctly. Through the continuous recalibration process described in connection with FIG. 3, however, administrators and educations will recognize the need to create more difficult content in order to provide users with questions of a greater degree of difficulty. In this manner, administrators and educators behind the RTPEP platform can provide users with content that demands the most from users in their test preparation experience and place users in the best position for success on test day.

Returning to FIG. 2, if the query at step 210, whether the user requested a quiz, is answered "no", then the user has requested a test. Unlike a quiz that in one embodiment is limited to presenting users with a designated number of questions designated as quiz questions, a practice test is administered with the actual test in the relevant field of study or interest in mind. That is, additional progressive content functionality of platform 100 is invoked when a practice test is given. One such addition progressive content functionality is increasing or decreasing the level of question difficulty if the user answers a number of recent questions correctly or incorrectly. In one embodiment, a practice test can be comprised of up to 275 questions. If a user answers three out of the last four answers correctly, then the next question is selected from those designated by the next higher difficulty level (either the next higher tier or next higher percentile) from the last question answered. Similarly, if a user answers three of the previous four questions incorrectly, then the next question is selected from those questions designed by the next lower difficulty level (either the next lower tier or next lower percentile).

This selection of a question to break a trend in either correct or incorrect answers can also take into account the category balance among all questions asked for one user's practice test. As discussed, the real time progressive content module 110 maintains an ideal balance among question categories. When the next question is selected for a user, both the difficulty level and category designations for that question are taken into account. Ideally, the next question posed will be from both the targeted difficulty level and come from a designation needed to maintain the category balance for the test. In the event, however, that a question having both the desired difficult designation and category designation to accommodate the preestablished criteria is not available, then the next question is selected based on the difficulty level. In other words, the default rule is that the difficulty level of a question takes precedence over the category level.

Figure 4:
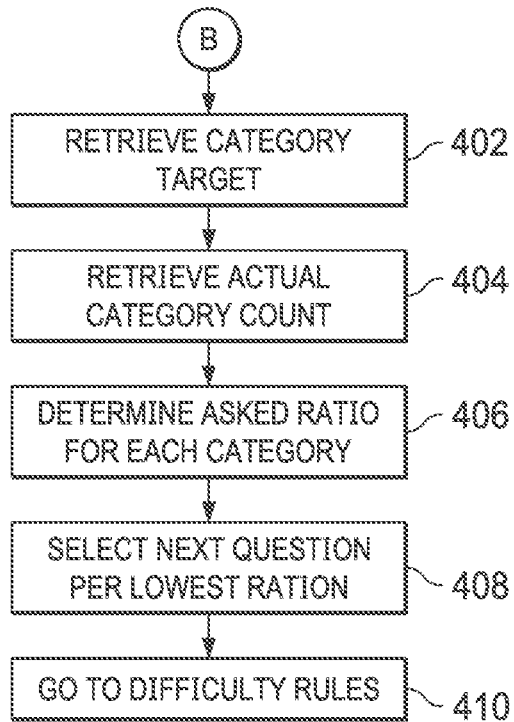
FIG. 4 is a flow diagram illustrating detailed steps of certain steps of the process of FIG. 2 performed according to an embodiment of the Real Time Progressive Examination Preparation platform.

In test mode, this trend-breaking question selection process is part of the test question selection step of step 232 in FIG. 2. In the absence of a trend of three of four correct answers or incorrect answers, real time progressive content module 110 selects a next question according to a preestablished distribution target of categories and difficulties associated with each question. At the start of a test session, it is contemplated that the first question will be of a low degree of difficulty from any target category selected from the tests database 156 associated with content generating module 150. Once the first question is answered, the updating and question selection processes described are invoked by real time content processing module 110 applying rules from rules database 126 and information stored in adaptive parameters database 112 to select subsequent test questions. First question selection, however, is by no means restricted. The administrator of the RTPEP can pre-select a first question category and/or a higher difficulty tier for the first question. In FIG. 2, as the updating process of FIG. 3 as discussed above continues to recalibrate the difficulty level assigned to each question and once selection step 232 is invoked, the process continues as depicted in FIG. 4. In one embodiment, the content generating module 150, user interface module 140, results module 130 and real time content processing module 110, through associated programs, perform in whole or in part the various steps detailed in FIG. 4. In FIG. 4, as a next question is selected, real time progressive content module 110 at step 402 retrieves the category target distribution for the test being administered. At step 404, the retrieved category target is compared to a running actual category count for the test currently administered to the user. That is, with the selection of the next question, module 110 analyzes the actual number of times a question from each category has been selected for the test. Once each category count from step 404 is retrieved, a ratio of selected questions from each category is calculated at step 406. Next, at step 408 a question from the category having the lowest ratio of selection is identified for inclusion in the test as the next question. At step 410, the difficulty rules are consulted to determine if the question selected for the desired category meets the difficulty requirement of this test. Once again, the trend rules are considered.

Figure 5:
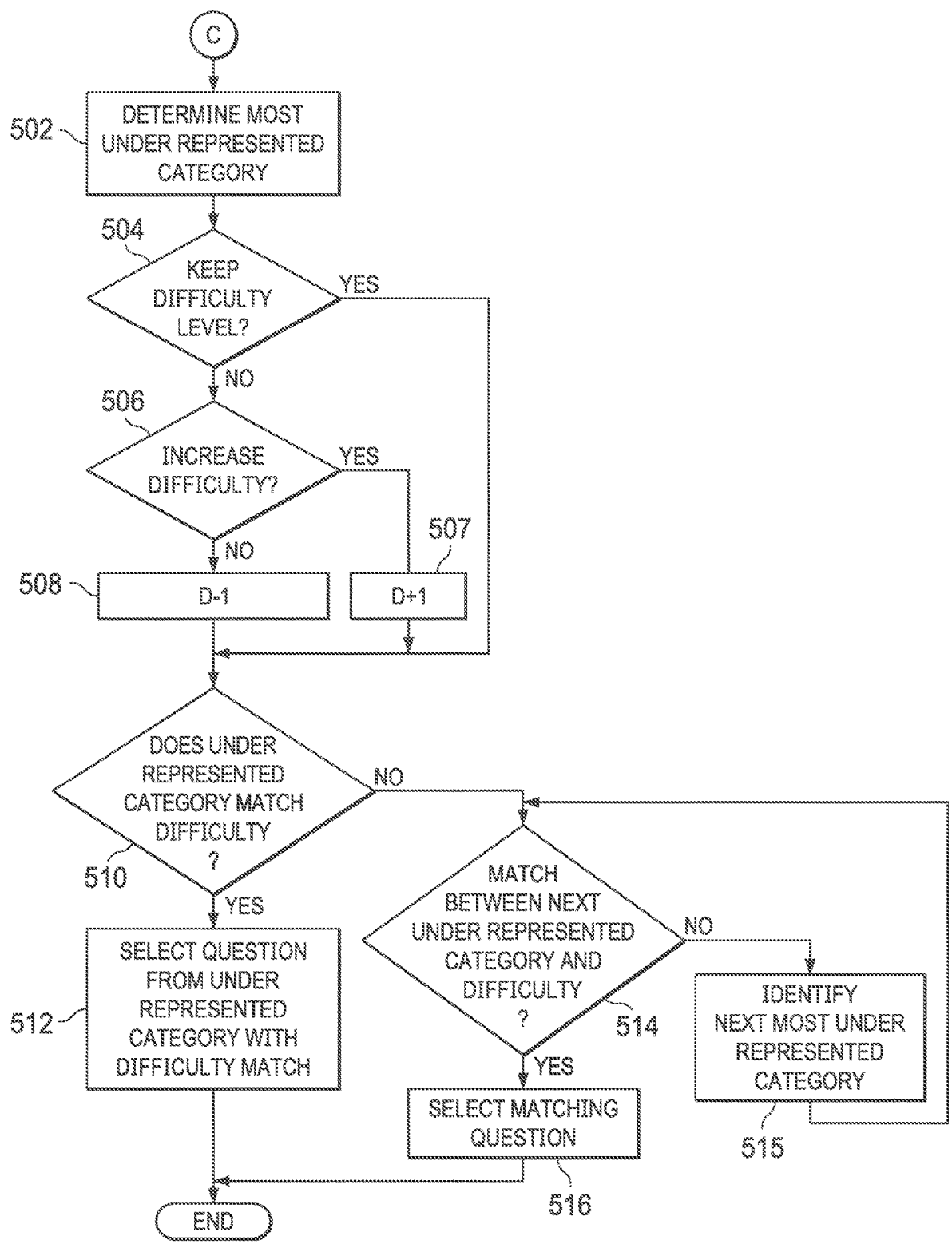
FIG. 5 is a flow diagram illustrating detailed steps of certain steps of the process of FIG. 2 performed according to an embodiment of the Real Time Progressive Examination Preparation platform.

The process of determining selection of a question from an underrepresented category in view of the level of difficulty of the next question presented during a test in depicted in FIG. 5. In one embodiment, the content generating module 150, user interface module 140, results module 130 and real time content processing module 110, through associated programs, perform in whole or in part the various steps detailed in FIG. 5. In one embodiment, the process of FIG. 5 is invoked at point C of FIG. 2. The process of FIG. 5 begins at step 502 in which the real time progressive content processing module 110 determines the most underrepresented category of test questions for a user's test. This can be performed by examination of the test question database 156 which is updated each time a question is included in a test. In test question database 156 the statistics for test question category selection can be maintained as well as the frequency in which a question is selected as well as the difficulty designation for that question. Once the most underrepresented category for the test is identified at step 502, the process moves to step 504 where real time progressive content module 110 queries whether the difficulty level should be maintained. Based on a user's performance within a test, the level of question difficulty is determined and the previous question answered by the student has an associated level of difficulty.

If the answer to the query of step 504 is "no", that the level of question difficulty should change, the process continues to step 506 where the system again queries whether the level of difficulty should increase. If the answer at step 506 is "yes" then at step 507 the level of difficulty for the next question is increased by one unit (either one percentile or one tier level). If, on the other hand, the answer at step 506 is "no", then at step 508 the level of difficulty for the next question is decreased by one unit (either one percentile or one tier level). Following either the increase in difficulty at step 507 or the decrease in difficulty at step 508, the process moves to step 510 where the system queries if there is a match of the underrepresented category and the requisite level of difficulty. In other words, is a test question available having the desired level of difficulty that stems from the desired question category? If the answer to query 510 is "yes", then the process proceeds to step 512 at which a question having both the requisite difficulty level and category designation is selected for submission to the user as the next test question. This test question can be selected from questions store 152 or test questions database 156.

If, on the other hand, the answer to query 510 is "no", then the process continues at step 514 where the query is posed of whether there is a match between the next lowest underrepresented category having a difficulty match. If the answer to query 514 is "yes" then the process continues at step 516 where the matching question from questions store 152 or test questions database 156 is selected as the next question. If, on the other hand, the answer to query 514 is "no", the process continues to step 515 where the next most underrepresented category is determined. Then, the process reverts back to step 514 where once again the question is posed of whether there is a question that is sourced to the next most underrepresented category and matches the requisite difficulty level. This feedback loop between steps 514 and 515 continues until there is a match.

These processes depicted in FIGS. 3 and 4, which are sub-processes of FIG. 2, maintain test integrity in terms of keeping the proper combination of test question difficulty and category balance. Each is important in providing users with an optimal test preparation experience and achieving satisfactory results.

Another facet of the RTPEP platform described herein is the progressive evaluation and reevaluation of test question difficulty. This evaluation and reevaluation occurs at the start of the test with selection of the first test question following a user's request to take a practice test. It also occurs during an administered practice test in order to provide users with questions of a challenging level of difficulty and at the same time provide a predictor of success when taking the real (as opposed to practice) examination.

The presently described RTPEP platform includes designating a score for each question answered by the user during a practice test. RTPEP platform relies heavily on standard deviation in this regard. As discussed above, a test question has a known difficulty value. Under one methodology, a test question can be valued between zero and 100, with zero being the value for the question that all users have answered correctly and 100 being the value for the question that no user has answered correctly.

For every question that a user has answered, a standard deviation of the scores assigned to each answered question is calculated. A user receives points for a question answered, whether the answer is correct or incorrect. The level of points awarded for a correct answer depends at least in part of the question's level of difficulty. The more difficult the question, the more points awarded, even if the answer is incorrect.

For example, a user who has answered six questions can be allocated points of 100, 90, 80, 55, 75 and 12 for the six questions (assuming the percentile methodology applies). The standard deviation of these scores is 31.63 and the average score is 68.67. At this juncture, the user can answer questions correctly that only 31.33 percent of users (100-68.67) answer correctly. As the number of questions answered by the user increases, the standard deviation decreases. After answering many more questions, the user's average may increase to 83.95 and the standard deviation decreases to 14.19. This is a function of points allocated per correct and incorrect answers.

Assuming that a standardized test, such as a NCLEX®—RN test, is deemed passed when it is determined that the user's measured knowledge is at least 1.96 standard errors (at a 95 percent confidence level) above a minimum passing line. The standard error is determined by dividing the standard deviation of score values by the square root of the number of samples. Thus, as the number of questions answered increases, the standard error decreases. For example, a standard deviation of fourteen for a sample size of thirty results in a standard error of 2.556 whereas a standard deviation of fourteen for a sample size of 140 results in a standard error of 1.14.

A ninety-five percent confidence level is represented by a 1.96 standard errors. In other words, it can be determined with ninety-five percent confidence that the user's true knowledge level is no more than 1.96 standard errors above or below the user's current average score for answered questions. Assume an exam has a minimum passing line of eighty percent. A user having an average score of 83 with a standard deviation of 14 after answering ninety questions, results in the following values used to derive a success prediction:

Mean=83
Standard Deviation=14
Total questions answered=90
Standard error=14/sqrt(90)=1.475

From these values a lower bound and upper bound is computed based on the confidence interval and standard error:

Lower Boundary=83−(1.96*1.475)=80.109
Upper Boundary=83+(1.96*1.475)=85.891

Since the calculated lower boundary is above eighty, which is assumed as the minimum passing score for the examination of interest, it is known with 95 percent confidence that the user's true knowledge is above eighty percent. This means that this user answers a combination of questions correctly that only twenty percent of test takers can.

In one embodiment of the RTPEP platform, a user must answer at least seventy-five questions in order to invoke a prediction that the user will pass the test. If after seventy-five answered questions the user's lower boundary value is determined to be above the minimum passing score of the test in question, the user's test will end and the user will be notified that he or she is deemed to be in a position to pass the actual examination of interest. At this point the practice test ends. On the other hand, if after seventy-five questions the user's upper boundary value is determined to be below the minimum passing score of the test in question, the user will fail. If the user's lower boundary value is above the minimum passing score and the upper boundary value is below the minimum passing score, the user will continue to be asked questions. Practically, once the user's upper boundary value falls below the minimum passing score the user will have to answer several more questions correctly in order for the upper boundary score to surpass the minimum required score. If after seventy-five questions are answered the user's lower boundary is not above the minimum passing percentage and the user's upper boundary is not below the minimum passing percentage, the user continues to be presented with questions until either the "pass" or "fail" boundary test is met. In one embodiment, if the user answers 276 questions and the user's lower boundary does not exceed the minimum passing grade, the test will end with a "fail" indication sent to the user. In this manner, even if the user's upper boundary score exceeds the minimum passing level, in order for the user to receive a "pass" prediction, the user must answer questions correctly at a frequency that raises the lower boundary score above the minimum pass rate before 276 questions are answered.

During the progressive valuation process described above, a user's upper and lower boundary score are predicted based on values assigned for correct and incorrect answers and the number of questions answered. At the same time, the RTPEP platform continuously and in real time evaluates and reevaluates the difficulty of questions based on the total number of times a question is answered correctly or incorrectly by all RTPEP platform users. Advantageously, the user's standard error value, score mean, standard deviation and upper boundary and lower boundary values are dynamic. As a user is engaged in a practice test, the RTPEP platform's constant designation of new difficulty values to questions to be asked or questions already asked and answered during a single practice test results in modification of the user's standard error value, score mean, standard deviation and upper and lower boundary values mid-test. This provides users with the most accurate and up to date information concerning his or her ability to pass an examination of interest. The user's upper and lower boundary values determined on a question by question basis based on the user's answers during a test and reflecting user-wide answer results for relevant questions enables users to receive optimal real time feedback.

As discussed above, in one embodiment, a user receives an indication of a predicted "pass" or "fail" determined by results module 130 after answering seventy-five questions. Prior to reaching the seventy-five question mark (and beyond) the user's upper and lower boundary values are computed on a question by question basis, while also taking into account adjustments to questions difficulty values based on user-wide answers to questions. This constant adjustment modifies the point values awarded for each of a user's correct and incorrect answers. In addition, determination of the upper and lower boundary values prior to the user answering seventy-five questions dictates at least in part the difficulty level of the next question asked. Recall that if a user answers three of four questions incorrectly then a question having a difficulty level lower than the difficulty level of the previous question is selected. Similarly, if a user answers three of four questions correctly then a question having a difficulty level higher than the difficulty level of the previous question is selected. Absent such a string of correct or incorrect answers (e.g., three out of four or any designated level), questions having a difficulty level that drives the user's upper and lower boundary level to the minimum passing score of the test are selected according to RTPEP category and difficulty.

For example, at the start of a practice test the user may be presented with several questions of low difficulty determined by platform wide user results for those questions. This run of questions of low difficulty will result in a high lower boundary value for that user. As the test progresses and the user's lower boundary remains high, questions of greater difficulty are selected to bring the user's lower boundary score more in line with the minimum passing score. Over a span of questions as the sample size increases, the user who continues to answer questions of heightened difficulty will maintain a lower boundary value above the minimum passing requirement as the question count approaches seventy-five (or any preset sample number). At the same time, if the user answers some of the more difficult questions correctly and some incorrectly, the lower boundary and upper boundary values will stabilize. If the user answers at least three of four questions correctly or incorrectly, the RTPEP platform will automatically cause a question of lower or higher difficulty value to be presented.

In operation, if the user answers many consecutive questions incorrectly, the user will be presented with easier questions and eventually the user's upper boundary score will fall well below the required minimum score, even if answered correctly. As a result, the user must answer several correct questions in order to receive a "pass" prediction. At the same time, if the user answers many questions correctly, the degree of difficulty of the questions will increase.

Similarly, if a user answers many questions correctly before seventy-five answers are submitted, her lower boundary value will tend to exceed the minimum passing score. As a result, more difficult questions are selected and it is expected that the user's lower boundary score will decrease as the user will answer incorrectly more frequently. For the exceptional user who continues to answer correctly questions of increased difficulty, the lower boundary value will continue to escalate to the point where only several incorrect answers will prevent the user from receiving the "pass" notification after seventy-five questions. The real time, self-correcting and self-adjusting processes of the RTPEP platform described herein strike the necessary balance of question selection in terms of difficulty and subject matter in order to provide the user with an accurate prediction of examination success.

Figure 6:
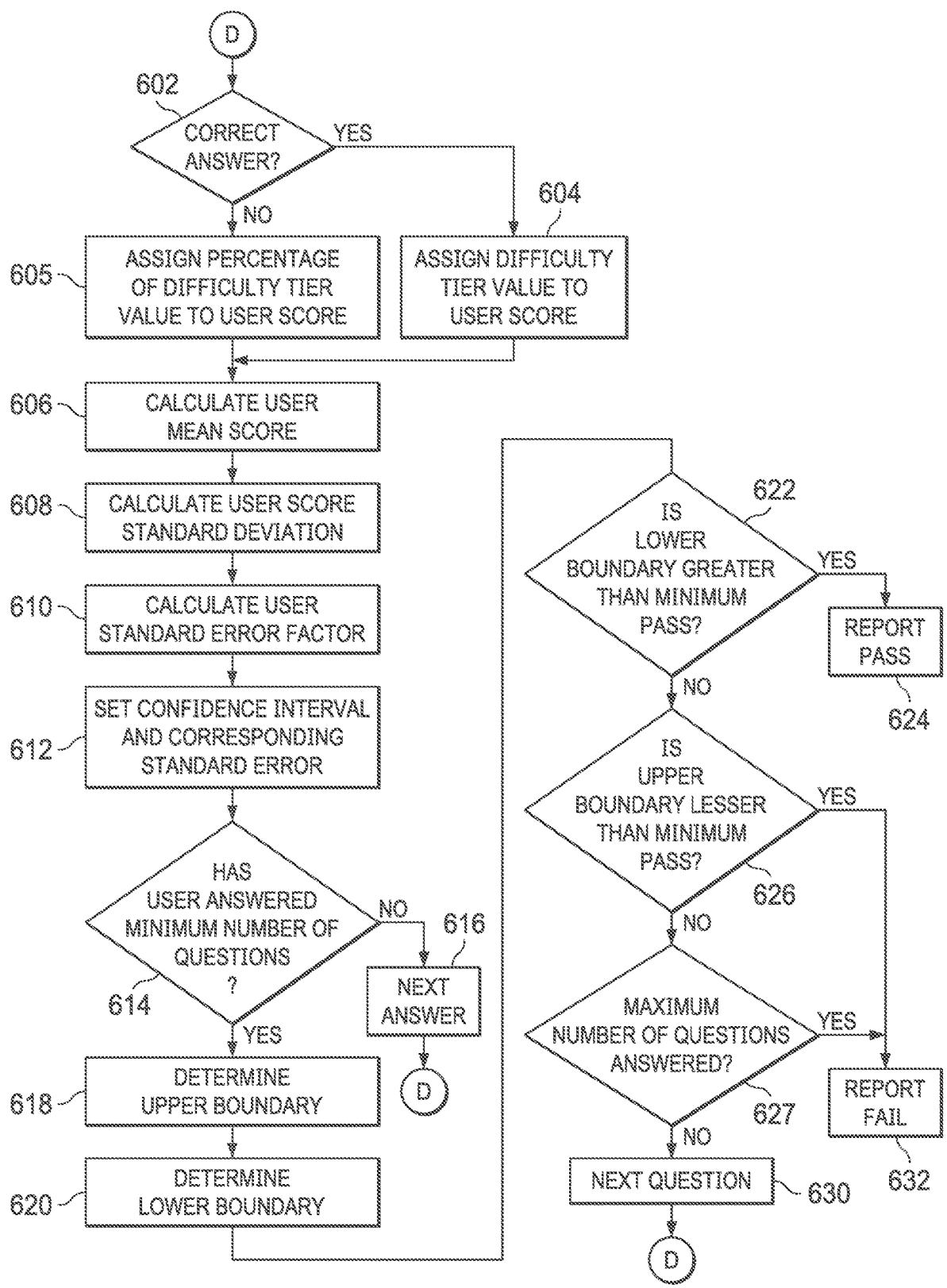
FIG. 6 is a flow diagram illustrating detailed steps of certain steps of the process of FIG. 2 performed according to an embodiment of the Real Time Progressive Examination Preparation platform.

Returning to FIG. 2, following the test question selection process of step 232, which is further depicted in FIGS. 4 and 5, at step 234 real time progressive content module 110 assigns a credit value for each question answered by the user. At step 236, the upper and lower boundary values for the user are determined. FIG. 6 provides a detailed flowchart of an embodiment of the credit assignment process and upper and lower boundary value determinations of step 234 and 236 discussed in detail above as performed by the RTPEP platform of the present invention. In one embodiment, the content generating module 150, user interface module 140, results module 130 and real time content processing module 110, through associated programs, perform in whole or in part the various steps detailed in FIG. 6.

The process of FIG. 6 of determining the answer credit assigned to the user after submitting an answer and the upper and lower boundary values for the user at a given point of an practice test. The process of FIG. 6 begins at step 602 with the query of whether the user submitted a correct answer to the last question given. If the answer to query 602 is "yes", then the process continues with step 604 with the step of assigning a value representing a full tier difficulty value to the user's score according to the difficulty tier level for the answered question. In one embodiment, the user receives more credit for correctly answering a question of higher difficulty than a question of lesser difficulty.

If, on the other hand, the answer to query 602 is "no" because the user answered the question incorrectly, then the process moves to step 605 where the user is assigned a fraction of the full tier difficulty value to the user's score according to the difficulty tier level for the answered question. In other words, the user receives "partial credit" for the incorrect answer. The partial credit score is based on the difficulty level of the question. In one embodiment, a user receives more credit for incorrectly answering a difficult question than an easy question. In addition, regardless of whether a user answers correctly or incorrectly, the value placed on a right or wrong answer is dynamic based on user answers received platform wide to questions. In operation, a question that is a new test question, that is, only very recently matured from a quiz question to a test question may be assigned an extreme difficulty value (either very low or very high). This is due to the low sample size of answers (right or wrong) for the new test question, although in one embodiment the level of correctness of user answers to the test question can include correct answers given to the question as a quiz question. In any event, the continuously evolving question difficulty valuation methods described herein place meaningful and suitable values on test questions answered by the user.

Following the assignment of a value to the user score for a correct answer at step 604 or an incorrect answer at step 605, the process continues with step 606 where the real time content processing module 110 calculates the user's mean score, followed by the user's standard deviation at step 608 and the user's standard error factor at step 610 taking into account the values assigned for all questions answered by the user. At step 612 a confidence interval is set and the standard error value determined for this confidence interval. As discussed above, a confidence interval is the level of confidence in a user's knowledge level that is acceptable by administrators of the RTPEP platform in order to provide useful predictions of user test performance. A ninety-five percent confidence interval is a high level of confidence in the effectiveness of the prediction.

At step 614 the platform queries whether the user has answered a minimum amount of questions required in order to invoke the upper or lower boundary predictions. If the answer to query 614 is "no", the process continues with step 616 and real time progressive content module 110 receives and processes the next answer of the user and the process returns to step 602. If, on the other hand, the answer of query 614 is "yes", then the process continues with step 618 where it an upper boundary value is determined. This upper boundary value is determined, as described above, by taking a current snapshot of the user's mean score, standard deviation, and user standard error factor and calculating the user's upper boundary value. Next, at step 620 the user's lower boundary value is calculated using the same data, as discussed above. Following calculation of the upper and lower boundary values, the process of FIG. 6 continues with step 622 where module 110 queries whether the user's lower boundary value is above the minimum passing score. If the answer to query 622 is "yes", then the process continues with step 624 and a "pass" report is transmitted to the user via user interface 140. If, on the other hand, the answer to query 622 is "no" then the process moves to step 626. At step 626 the question is asked whether the user's upper boundary value is below the minimum passing score. If the answer to this question is "no" then the user continues to step 627 by querying whether the maximum number of questions have been answered. If the answer to query 627 is "no" then the user is presented with another question at step 630. If on the other hand the answer to query 627 is "yes" then the user is presented with a "fail" message at step 632.

If, on the other hand, the answer to query 626 is "yes", that the user's upper boundary value is less than the minimum passing score, then the user is presented with a "fail" message at step 632.

Significantly, RTPEP platform 100 calibrates mid-test according to the user's answers and platform wide user answers. The latter drive the credit values given for correct and incorrect answers, which in turn drive the standard error value for the user upon answering each question. The novel and ever-evolving dynamic user standard error value determinations enable real time progressive content module 110 to effectively predict, in real time, the user's likelihood at real examination success.

While the invention has been particularly shown and described with reference to a preferred embodiment, it will be understood by those skilled in the art that various changes in form and detail may be made therein without departing from the spirit and scope of the invention.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

ADDITIONAL DESCRIPTION

The following clauses are offered as further description of the disclosed invention.

Clause 1. A computer-implemented system for generating study exercises operating in real time with respect of a plurality of question answers received from a plurality of users, comprising: a real time content processing module comprising:
a processor;
a user input data module operable to receive content;
a data store of examination content comprising examination question attributes comprising question topics, question answers, question frequency and question difficulty values;
the content processing module configured to:

assign a difficulty value to each of a plurality of examination questions according to the plurality of user answers to a plurality of questions received by the content processing module;

award to the user a credit for a question answer received from the user according to the correctness of the answer and the difficulty value of the answered question;

calculate for the user an upper passing value and a lower passing value according to the credits awarded to the user and an error factor determined from answers received from the user by the content processing module;

compare the upper passing value and the lower passing value to a predefined minimum passing value;

adjust, according to question answers received by the plurality of users, the difficulty value of at least one of the plurality of questions;

transmit to the user, according to the user's upper passing value and the user's lower passing value, the adjusted difficulty value of the at least one of the plurality of questions, the user's answer to at least one previous question, the assigned difficulty value, and a question topic associated with each of the plurality of examination questions, a next question; and determine according to the comparison of the user's upper passing value and the user's lower passing value to the predefined minimum passing value a test result based on the number of questions answered by the user exceeding a threshold question number value.

Clause 2. The computer implemented system of any preceding or proceeding clause, further comprising the content processing module further configured to designate a quiz question as a test question once a number of quiz questions answers received exceeds a minimum threshold quiz question value.

Clause 3. The computer implemented system of any preceding or proceeding clause, further comprising the content processing module further configured to transmit the next question according to the difficulty value of the next question.

Clause 4. The computer implemented system of any preceding or proceeding clause, further comprising the content processing module further configured to transmit the next question according to the question topic of the next question.

Clause 5. The computer implemented system of any preceding or proceeding clause, further comprising the content processing module further configured to calculate the lower passing value based on a mean of the user's scores less a predefined confidence value factored by the user's error factor.

Clause 6. The computer implemented system of any preceding or proceeding clause, further comprising the content processing module further configured to calculate the upper passing value based on a mean of the user's scores plus a predefined confidence value factored by the user's error factor.

Clause 7. A progressive real time study exercise generating method comprising:

assigning a difficulty value to each of a plurality of examination questions according to the plurality of user answers to a plurality of questions received by the content processing module;

awarding to the user a credit for a question answer received from the user according to the correctness of the answer and the difficulty value of the answered question;

calculating for the user an upper passing value and a lower passing value according to the credits awarded to the user and an error factor determined from answers received from the user by the content processing module;

comparing the upper passing value and the lower passing value to a predefined minimum passing value;

adjusting, executed by a processor, according to question answers received by the plurality of users, the difficulty value of at least one of the plurality of questions;

transmit to the user, according to the user's upper passing value and the user's lower passing value, the adjusted difficulty value of the at least one of the plurality of questions, the user's answer to at least one previous question, the assigned difficulty value, and a question topic associated with each of the plurality of examination questions, a next question; and determining, executed by the processor, according to the comparison of the user's upper passing value and the user's lower passing value to the predefined minimum passing value a test result based on the number of questions answered by the user exceeding a threshold question number value.

Clause 8. The method of any preceding or proceeding clause further comprising designating a quiz question as a test question once a number of quiz questions answers received exceeds a minimum threshold quiz question value.

Clause 9. The method of any preceding or proceeding clause further comprising transmitting the next question according to the difficulty value of the next question.

Clause 10. The method of any preceding or proceeding clause further comprising transmitting the next question according to the question topic of the next question.

Clause 11. The method of any preceding or proceeding clause further comprising calculating the lower passing value based on a mean of the user's scores less a predefined confidence value factored by the user's error factor.

Clause 12. The method of any preceding clause further comprising determining the upper passing value based on a mean of the user's scores plus a predefined confidence value factored by the user's error factor.

What is claimed is:

1. A computer-implemented system for generating study exercises operating in real time with respect of a plurality of question answers received from a plurality of users, comprising: a real time content processing module comprising:

a processor;

a user input data module operable to receive content;

a data store of examination content comprising examination question attributes comprising question topics, question answers, question frequency and question difficulty values;

the content processing module configured to:

assign a difficulty value to each of a plurality of examination questions according to the plurality of user answers to a plurality of questions received by the content processing module;

award to the user a credit for a question answer received from the user according to the correctness of the answer and the difficulty value of the answered question;

calculate for the user an upper passing value and a lower passing value according to the credits awarded to the user and an error factor determined from answers received from the user by the content processing module;

compare the upper passing value and the lower passing value to a predefined minimum passing value;

adjust, according to question answers received by the plurality of users, the difficulty value of at least one of the plurality of questions;

transmit to the user, according to the user's upper passing value and the user's lower passing value, the adjusted difficulty value of the at least one of the plurality of questions, the user's answer to at least one previous question, the assigned difficulty value, and a question topic associated with each of the plurality of examination questions, a next question; and according to the comparison of the user's upper passing value and the user's lower passing value to the predefined minimum passing value a test result based on the number of questions answered by the user exceeding a threshold question number value.

2. The computer implemented system of claim 1, further comprising the content processing module further configured to designate a quiz question as a test question once a number of quiz questions answers received exceeds a minimum threshold quiz question value.

3. The computer implemented system of claim 1, further comprising the content processing module further configured to transmit the next question according to the difficulty value of the next question.

4. The computer implemented system of claim 1, further comprising the content processing module further configured to transmit the next question according to the question topic of the next question.

5. The computer implemented system of claim 1, further comprising the content processing module further configured to calculate the lower passing value based on a mean of the user's scores less a predefined confidence value factored by the user's error factor.

6. The computer implemented system of claim 1, further comprising the content processing module further configured to determine the upper passing value based on a mean of the user's scores plus a predefined confidence value factored by the user's error factor.

7. A progressive real time study exercise generating method comprising:

assigning a difficulty value to each of a plurality of examination questions according to the plurality of user answers to a plurality of questions received by the content processing module;

awarding to the user a credit for a question answer received from the user according to the correctness of the answer and the difficulty value of the answered question;

calculating for the user an upper passing value and a lower passing value according to the credits awarded to the user and an error factor determined from answers received from the user by the content processing module;

comparing the upper passing value and the lower passing value to a predefined minimum passing value;

adjusting, executed by a processor, according to question answers received by the plurality of users, the difficulty value of at least one of the plurality of questions; transmit to the user, according to the user's upper passing value and the user's lower passing value, the adjusted difficulty value of the at least one of the plurality of questions, the user's answer to at least one previous question, the assigned difficulty value, and a question topic associated with each of the plurality of examination questions, a next question; and determining, executed by the processor, according to the comparison of the user's upper passing value and the user's lower passing value to the predefined minimum passing value a test result based on the number of questions answered by the user exceeding a threshold question number value.

8. The method of claim 7, further comprising designating a quiz question as a test question once a number of quiz questions answers received exceeds a minimum threshold quiz question value.

9. The method of claim 7, further comprising transmitting the next question according to the difficulty value of the next question.

10. The method of claim 7, further comprising transmitting the next question according to the question topic of the next question.

11. The method of claim 7, further comprising calculating the lower passing value based on a mean of the user's scores less a predefined confidence value factored by the user's error factor.

12. The method of claim 7, further comprising determining the upper passing value based on a mean of the user's scores plus a predefined confidence value factored by the user's error factor.

* * * * *